United States Patent [19]
Cole et al.

[11] Patent Number: 5,335,224
[45] Date of Patent: Aug. 2, 1994

[54] SERVICE GUARANTEES/CONGESTION CONTROL IN HIGH SPEED NETWORKS

[75] Inventors: Robert G. Cole, Eatontown; Kerry W. Fendick, Middletown; Manoel A. Rodrigues, Atlantic Highlands, all of N.J.

[73] Assignee: AT&T Bell Laboratories, Murray Hill, N.J.

[21] Appl. No.: 906,964

[22] Filed: Jun. 30, 1992

[51] Int. Cl.$^5$ .................... H04J 3/22; H04L 12/56
[52] U.S. Cl. ...................................... 370/84; 370/94.1
[58] Field of Search .................. 370/60, 60.1, 61, 94.1, 370/94.2, 94.3, 84; 340/825.16

[56] References Cited

U.S. PATENT DOCUMENTS

| | | | |
|---|---|---|---|
| 4,475,192 | 10/1984 | Fernow et al. | 370/60 |
| 4,769,811 | 9/1988 | Eckberg, Jr. et al. | 370/94.1 |
| 4,849,968 | 7/1989 | Turner | 370/60 |
| 4,953,157 | 8/1990 | Franklin et al. | 370/94.1 |

*Primary Examiner*—Douglas W. Olms
*Assistant Examiner*—Hassan Kizou
*Attorney, Agent, or Firm*—Eugene J. Rosenthal; Ronald D. Slusky

[57] ABSTRACT

Congestion control is implemented at the resources that actually suffer from congestion and, moreover the congestion control is performed within the network as well as at its access points. In a particular embodiment, congestion control is continuously performed at each resource. Use of each resource is controlled according to a head-of-the-line weighted round-robin service discipline thereby assuring fairness and full use of bandwidth for all active channels. Also, in order to control conditions of congestion, the queue of data elements waiting for service at each resource is regulated by a global congestion indicator for the entire queue. The data elements of each channel that are waiting for service are further regulated in response to specific local congestion indicators that are individualized for each channel. The global and local congestion indicators are used to guarantee predetermined levels of service for each channel. The values employed for the head-of-the-line weighted round-robin service discipline are developed as a function of at least the contracted-for bandwidth for each channel. The developed values are replicated for each resource subject to congestion control.

17 Claims, 8 Drawing Sheets

| CHANNEL | $\gamma_i$ |
|---------|------------|
| 1 | 1 |
| 2 | 1 |
| ⋮ | ⋮ |
| M | 2 |

SERVICE GUARANTEES/CONGESTION CONTROL IN HIGH SPEED NETWORKS

TECHNICAL FIELD

This invention relates to congestion controls for use in data networks.

BACKGROUND OF THE INVENTION

Data networks switch elements of data (data elements) such as packets or cells. In such data networks, them typically exist various defined channels, such as virtual circuits, over which the data elements are carried. Each channel shares resources of the network, a resource being, for example, a queue and an associated server. Typically, a minimum bandwidth is assigned to each channel in the network according to a contract between the network provider and an entity to which the channel is assigned. An entity may be a group of data element sources or it may be a single data element source. An association exists between each data element and a channel assigned to its source. The association may be established before, or as, the data element enters the data network.

Prior data networks of the type in which a minimum bandwidth is contracted for by each channel have suffered from a variety of problems in their allocation of bandwidth to the active channels at a resource, i.e., those channels at the resource that are carrying data elements at a particular time. One such problem is the so-called fairness problem, i.e., how to fairly share any available excess bandwidth among the active channels. Another problem relates to insuring that the active channels are allowed to actually make use of all of the bandwidth for which they have contracted. This problem arises because it is possible that an end-to-end protocol being employed over a channel may interact with the congestion control mechanisms employed by the network in such a way that a channel's contracted-for bandwidth is never actually achieved.

Additional problems arise in the area of congestion control. Prior congestion control techniques tended, in the face of congestion, to drop data elements from all channels that exceeded their contracted-for bandwidth. This, however, could exacerbate the congestion by causing such channels to retransmit all their dropped data elements. Furthermore, such techniques for data element dropping typically result in the retransmission over a channel of more data elements than were actually dropped. Another problem with prior congestion control techniques is that many of them result in high delays for data elements in those channels that are transmitting within their contracted-for bandwidth. Lastly, errors that occur in the estimation of the actual bandwidth being used by each channel may cause a particular channel's data elements to be dropped even though such a channel is actually within its contracted-for bandwidth. This unnecessary data element dropping results in additional data element retransmissions and, potentially, additional congestion.

Summary of the Invention

Prior congestion control techniques have attempted to control the congestion that can occur at the resources of a network by either regulating the entry of data elements into the network at the network's access points or by marking excessive data elements upon their entry into the network so that such marked data elements can be dropped should congestion develop. We have recognized that such congestion control techniques merely attempt to avoid the development of congestion within the network. In fact, however, such techniques are essentially ineffective in solving the problems described above should their congestion avoidance efforts fail and, as a result, congestion actually develops within the network. Advantageously, however, the problems with such prior art congestion control techniques are overcome, in accordance with the principles of the invention, by implementing congestion control at the resources that actually suffer from congestion and, particularly, by performing the entire congestion control process not just at those resources that are at the network's access points, but at each resource within the network as well.

In preferred embodiments, congestion control is continuously performed at each resource. Use of each resource is controlled according to a head-of-the-line weighted round-robin service discipline, thereby assuring fairness and full use of bandwidth for all active channels. Also, in order to control conditions of congestion, the queue of data elements waiting for service at each resource is regulated by employing a global congestion threshold that is used to determine when the entire queue is in a congested state. In accordance with an aspect of the invention, the data elements associated with each channel are further regulated in response to individual local congestion thresholds, one for each channel, that are used to determine when a particular channel at a resource is in a congested state. The global and local congestion thresholds are used to guarantee predetermined levels of service for each channel. The values employed for the head-of-the-line weighted round-robin service discipline are developed as a function of at least the contracted-for bandwidth for each channel. The developed values are replicated for each resource subject to congestion control.

Preferably, congestion is determined to exist at a resource when fixed, predetermined thresholds developed from a) the contracted-for bandwidths, b) the observed traffic characteristics and c) the amount of storage capacity available for the queue are exceeded. Data elements associated with a particular channel are dropped only when congestion is determined to exist for both the entire queue and for that particular channel.

BRIEF DESCRIPTION OF THE DRAWING P In the drawing.

DETAILED DESCRIPTION

Figure 1:
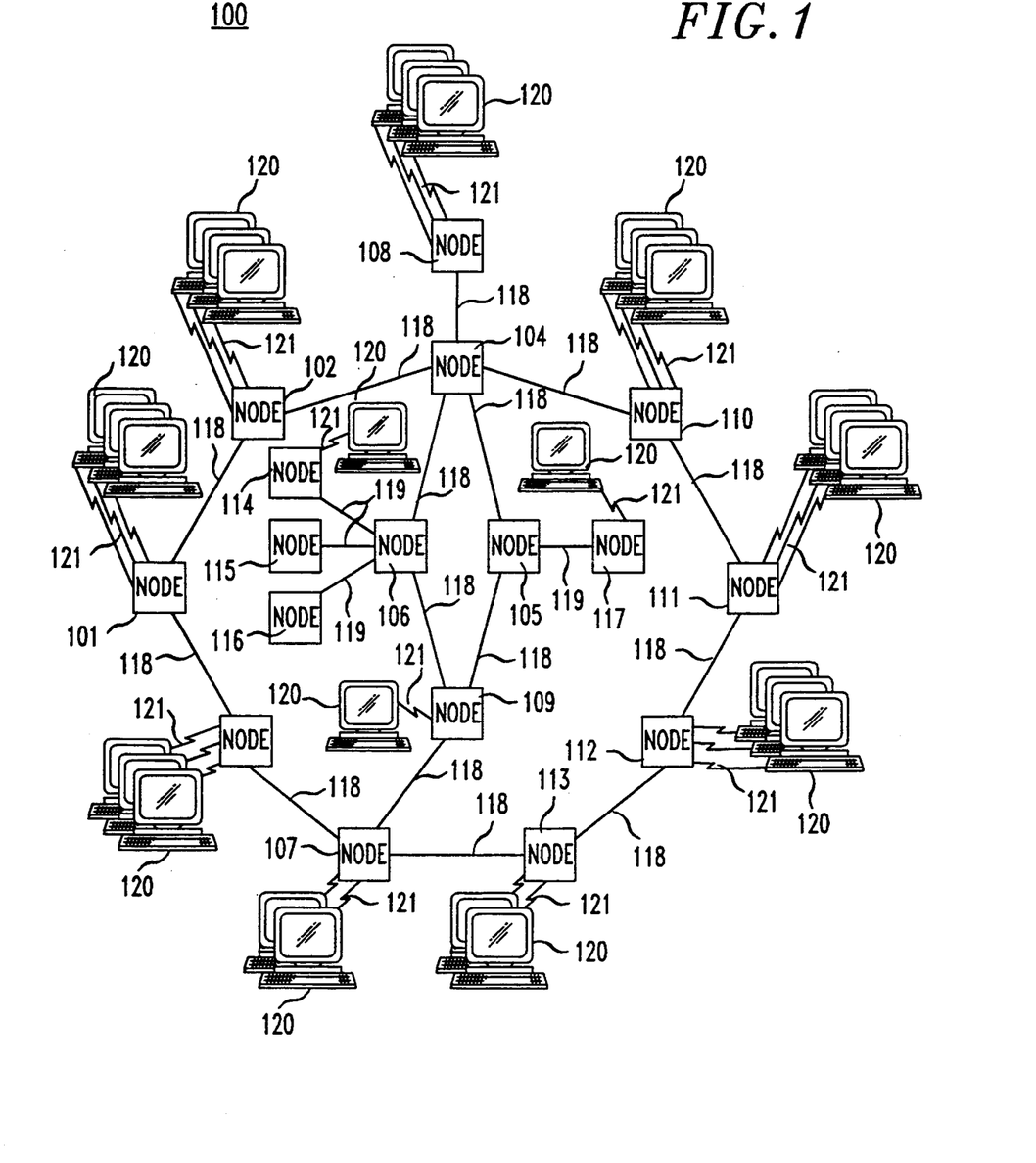
FIG. 1 shows an exemplary network embodying the principles of the invention.

FIG. 1 shows exemplary data network 100 in which the present invention is used. Data network 100 includes nodes 101 through 117, high speed links 118, low speed links 119, data sources 120 and access links 121. High speed links 118 and low speed links 119 interconnect nodes 101 through 117, in the manner shown. Access links 121 connect data sources 120 to various ones of the nodes of data network 100. Data network 100 switches data elements, e.g., either packets or cells. If data network 100 switches packets, in particular, it is called a packet switched network. The data elements are supplied from data sources 120. Each data element contains an indication that uniquely identifies a channel to which it is assigned.

Figure 2:
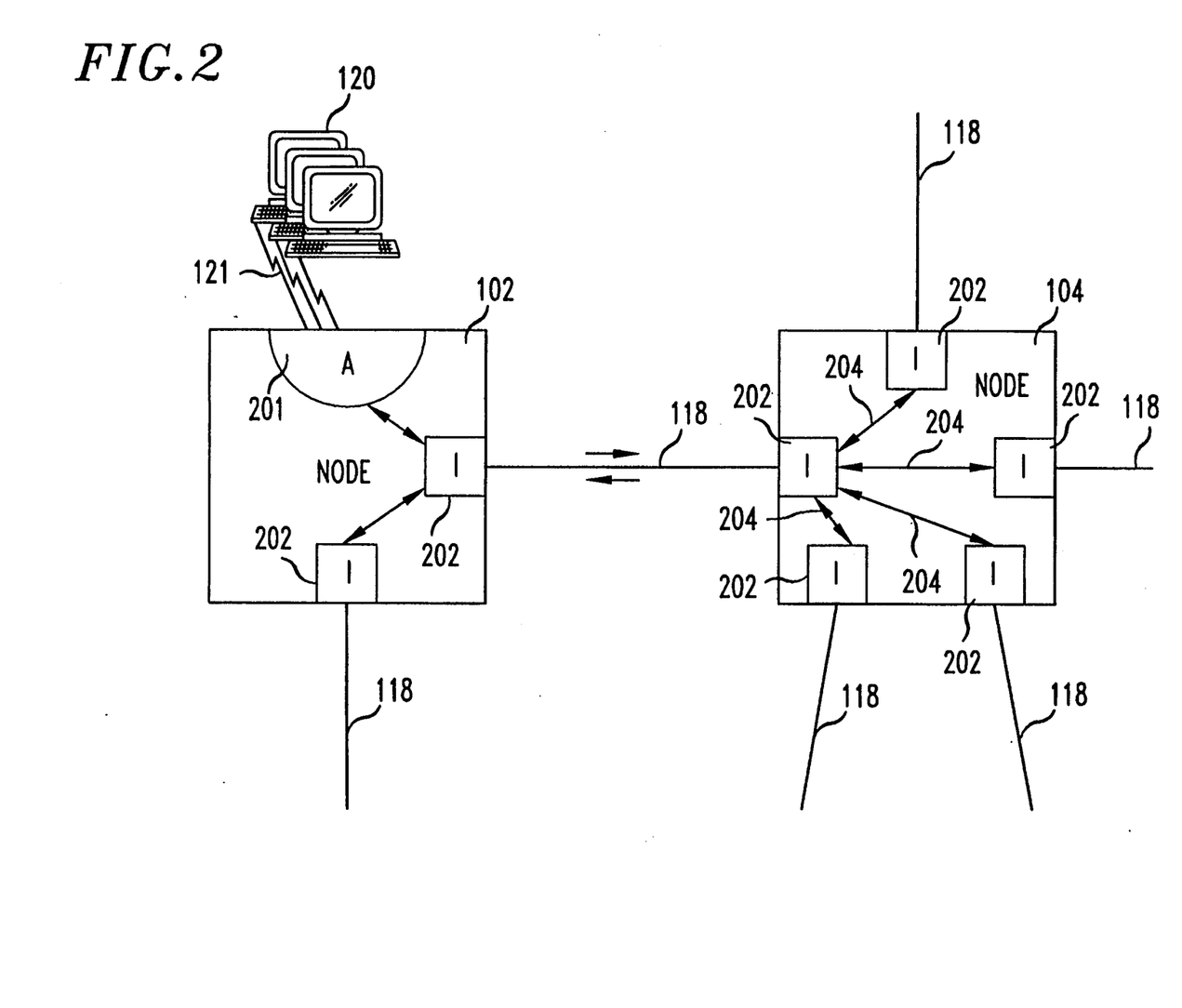
FIG. 2 shows an expanded view of two of the nodes of the network shown in FIG. 1.

FIG. 2 shows an expanded view of nodes 102 and 104. Node 102 includes access interface resource (A) 201, embodying aspects of the invention, and internal communications resources (I) 202, embodying aspects of the invention. Node 102 includes two of the internal communications resources (I) 202, one for each high speed link 118 terminating at node 102. Node 104 includes the five internal communications resources (I) 202 shown, one for each high speed link 118 terminating at node 104. Access interface resource (A) 201 controls communication of data elements between data network and data sources 120 over access links 121. Each internal communications resource (I) 202 controls the communications of data elements within data network 100 over the internal links to which it is connected, which in the case of nodes 102 and 104 are all high speed links 118. Similarly, internal communications resources (I) 202 within other nodes control the communication of data elements within data network 100 over low speed links 119. Access interface resource (A) 201 and internal communications resources (I) 202 can both employ the service discipline and congestion control techniques described below, pursuant to the invention.

Figure 3:
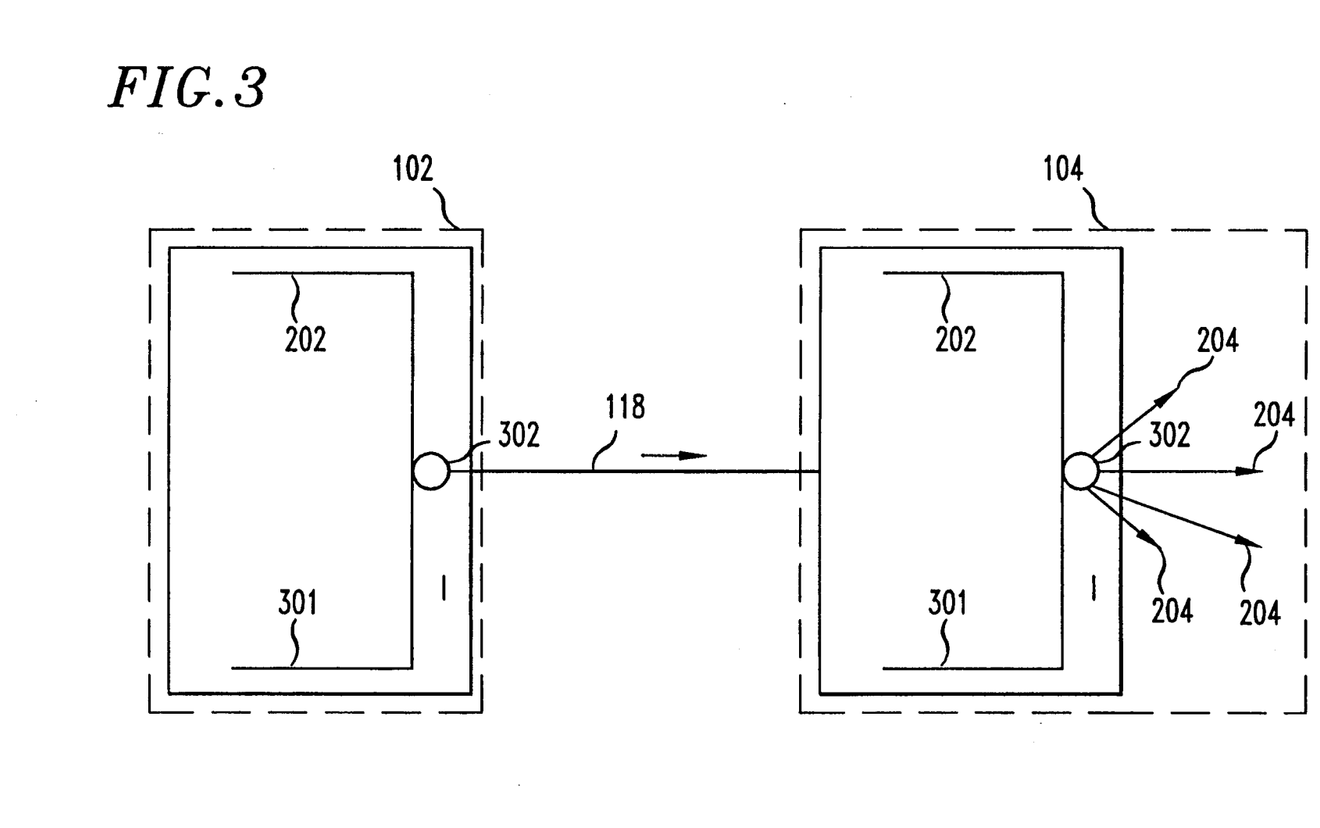
FIG. 3 shows transmission queues and servers for the nodes shown in FIG. 2.

FIG. 3 shows transmission queues 301 and servers 302 within internal communications resource (I) 202 for a single direction of transmission. Data elements for transmission via high speed link 118 are queued in queue 301 prior to service and transmission by server 302. Server 302 can either transmit data elements out of the node, e.g., to a next node or to a data source, or route the data element to an appropriate resource within the node over links 204. Typically queue 301 and server 302 are made up of a processor and its associated memory. The memory stores queued data elements while the processor manages the queue and performs the servicing functions.

Figure 4:
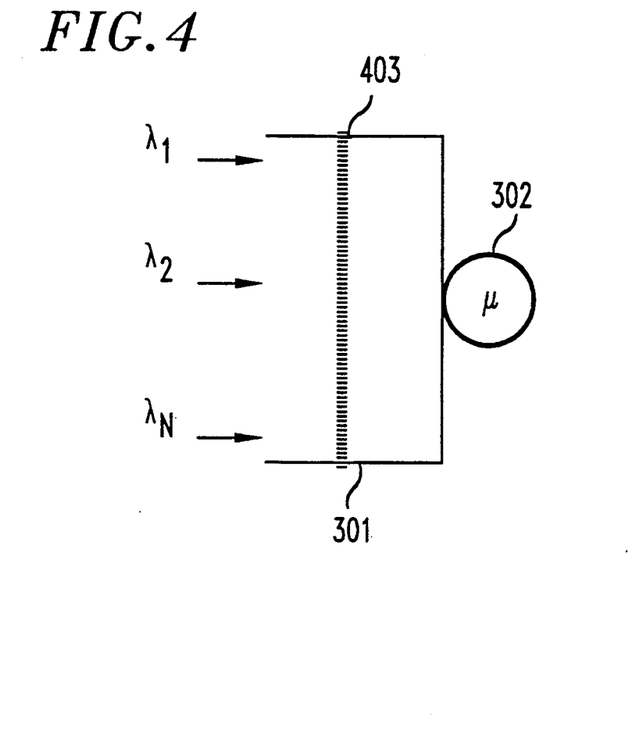
FIG. 4 shows another view of one queue and server from FIG. 3.

FIG. 4 is a view of a typical queue 301 and server 302 of FIG. 3. In data networks such as data network 100, them typically exist various defined channels, such as virtual circuits, over which the data elements are carried. Queue 301 may receive data elements that were supplied by any channel of network 100.

A minimum bandwidth is assigned to each channel in the network according to a contract between the network provider and an entity to which the channel is assigned. An entity may be a group of user data sources 120 or it may be a single user data source 120. An association exists between a data element and a channel assigned to the one of user data sources 120 that supplied the data element. The association may be established either before the data element enters the data network or in the one of access interface resources (A) 201 at which the data element is processed into data network 100. After being processed into data network 100, each data element is routed to its destination user data source 120.

Each data element may pass through several of nodes 101 through 117 before reaching its destination. As a result, packets from different channels may simultaneously be waiting in queue 301 of resource for service by the associated server 302. Furthermore, the data elements of a single channel that are arriving at queue 301 may have traveled over physically diverse routes if they were supplied from different ones of user data sources 120.

As noted, an active channel at a resource is a channel that is carrying data elements at a particular time. Therefore, a channel is an active channel at a resource if at least one data element has been received from the channel and that data element is either currently a) awaiting service in queue 301 or b) is being served by server 302. There are M channels defined in data network (FIG. 1). Each channel is indicated by the subscript i, where i=1, . . . , M. Not all the channels need be active at any particular time or at any particular resource. The data elements of a channel active at a resource arrive that resource at the rate of $\lambda_i$. Each server 302 is capable of serving and transmitting data elements at its own predetermined maximum service rate $\mu$. FIG. 4 also shows global congestion threshold 403, which will be discussed further below.

Figure 5:
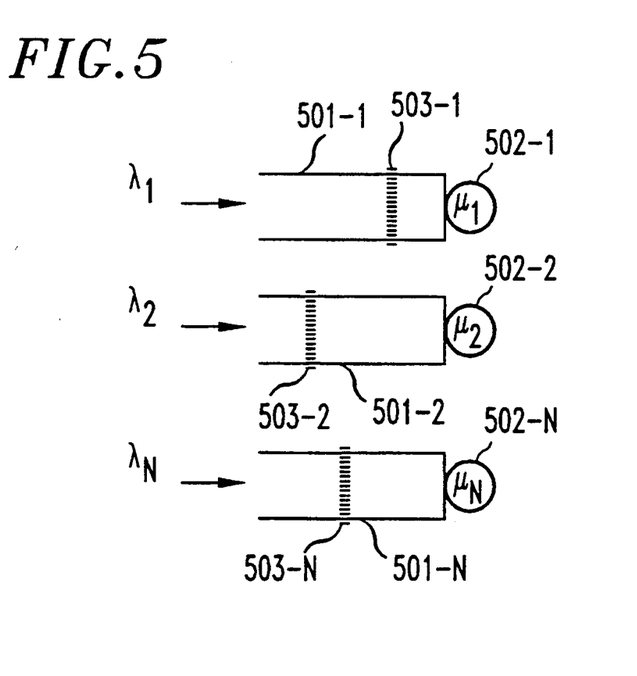
FIG. 5 is a conceptual model showing queue and server of FIG. 4 as being comprised of several smaller queues and corresponding servers.

The arrangement as thus far described is standard in the art. In applying the principles of the invention, however, queue 301 and server 302 are logically transformed, as shown in FIG. 5, into several smaller queues 501-1 through 501-N and corresponding servers 502-1 through 502-N. N is equal to the number of active channels in the queue 301 and server 302 combination. Each queue 501-i is associated with a single active channel and it only contains data elements owned by that channel. Thus, each queue 501-i can be thought of as a sub-queue dedicated to the data elements of its particular associated active channel. Correspondingly, each server 502-i has its own associated service rate $\mu_i$ and it only processes data elements from the queue 501-i of its particular associated active channel.

In preferred embodiments of the invention, server 302 implements the known head-of-the-line weighted round-robin service discipline for serving data elements from each active channel. In accordance with that discipline, data elements are strictly separated on the basis of the channel to which they are associated and server 302 processes a predetermined number of data elements from the head of each active channel, after which server 302 proceeds to process data elements from the head of the next active channel. The number of data elements processed from each particular active channel is a function of the channel's contracted-for bandwidth, hence the discipline is "weighted". This discipline is equivalent to having each server 502-i serve its data elements according to the well known first-in-first-out (FIFO) service discipline with rate $\mu_i$ with the operation of each server 502-i being independent of the service of any other server 502-i. This is because the values of the various $\mu_i$ vary as a function of the number of active channels and their respective contracted-for bandwidths. Each $\mu_i$ is also a function of $\mu$ of server 302.

Figure 6:
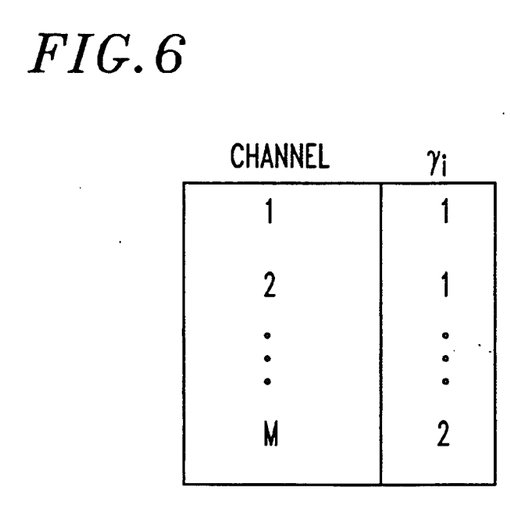
FIG. 6 shows a table of proportional service rates for each of M channels of the queue and server shown in FIG. 3.

The proportional service rate for a channel is a representation of the channel's contracted-for bandwidth, and it is directly proportional thereto. FIG. 6 shows a table of proportional service rates $v_i$ for each of channels 1, ..., M of data network 100. In the example of FIG. 6, each channel has the same contracted-for bandwidth, except that channel M has a contracted-for bandwidth that is twice that of any other channel.

At any time, a particular $\mu_i$ is determined by multiplying the associated proportional service rate $v_i$ by $\mu$ and dividing the result by the sum of the proportional service rates of the active channels. As an example, assume that N=3 and that the active channels are 1, 2 and M. From FIG. 6, the proportional service rate for each of channels 1 and 2 is 1, while for channel M it is 2. Therefore, the sum of the proportional service rates is 1+1+2=4 and $\mu_1$, $\mu_2$, and $\mu_M$ are $\mu/4$, $\mu/4$ and $\mu/2$, respectively.

FIG. 5 also shows local congestion thresholds 503-i, designated as local congestion threshold 503-1 through 503-N. These thresholds, which need not be the same, indicate when a sub-queue for a particular channel is considered congested, as described more fully below.

Figure 7:
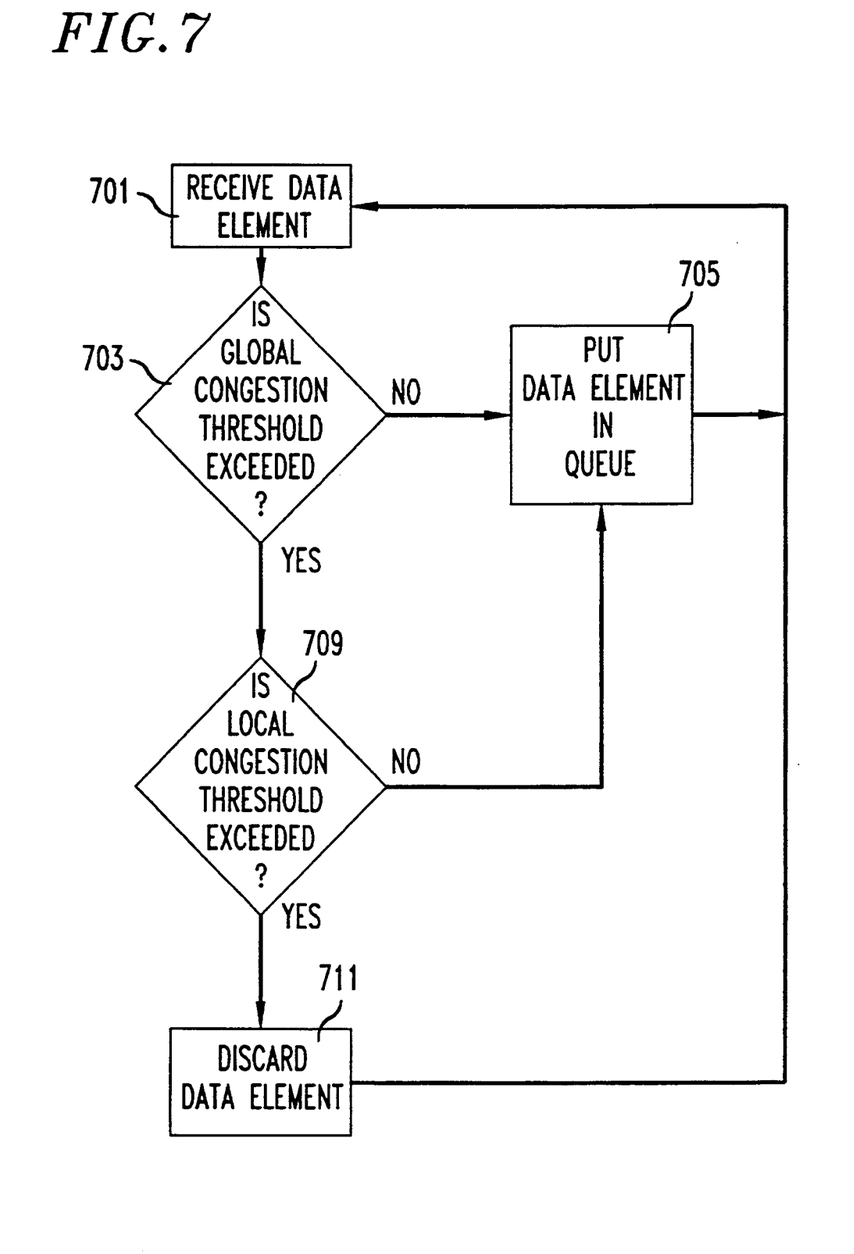
FIG. 7 shows a flow chart of a process for congestion control, in accordance with the principles of the invention.

FIG. 7 shows a flow chart of a process for congestion control, in accordance with the principles of the invention. This process manages the operation of queue 301 and server 302 in such a way as to effectively achieve the sub-queue structure of FIG. 5.

In particular, the process is entered in step 701 when a data element, uniquely associated with one of channels 1 to M, arrives at queue 301 (FIG. 4). Next, conditional branch point 703 tests to determine if global congestion threshold 403 is exceeded. This test is performed by determining if the total number of bytes already in queue 301 and the number of bytes in the just-received data element is greater than the value of global congestion threshold 403. For this embodiment, global congestion threshold 403 is a fixed threshold indicating a predetermined queue length. The manner in which the value of global congestion threshold 403 may be selected is discussed hereinbelow. If the test result in step 703 is NO, there is no congestion in queue 301. Therefore, control passes to step 705 and the just-received data element is stored in queue 301 to await service by server 302. Thereafter, the process returns to step 701 to receive a new data element.

If the test result in step 703 is YES, there is congestion at queue 301. Therefore, control passes to conditional branch point 709, which tests to determine if the local congestion threshold 503-i (FIG. 5) for the queue 501-i of the channel associated with the just-received data element is exceeded. The manner in which the values of local congestion thresholds 503-i are developed is discussed hereinbelow. If the test result in step 709 is NO, the channel associated with the just-received data element is not one of the major causes of the congestion at queue 301. Therefore, control passes to step 705 and, again, the just-received data element is placed in queue 301 to await service by server 302. Thereafter, the process returns to step 701 to receive a new data element.

If the test result in step 709 is YES, the channel associated with the just-received data element is, indeed, one of the major causes of the congestion at queue 301. Therefore, control passes to step 711 and the just-received data element is dropped, or discarded, in an attempt to alleviate the congestion. Thereafter, the process again returns to step 701.

It directly follows from queuing theory that congestion must eventually result if the quantity $$\rho_{tot} = \frac{\sum_{\text{all active channels}} \lambda_i}{\mu}$$

remains greater than 1 for an extended period. This congestion condition can be brought about, however, even if not all active channels exceed their contracted-for bandwidths. For example, some channels may dramatically exceed their contracted-for bandwidths, while others may only slightly exceed their contracted-for bandwidths, while still others may be significantly below their contracted-for bandwidths.

Advantageously, the inventive process shown in FIG. 7 insures that only those channels that are major causes of congestion, i.e., those which introduce data elements into network 100 at a rate which greatly exceeds their contracted for bandwidth so that global congestion at a resource results, will have their data elements dropped. It further guarantees that each channel can achieve at least its contracted-for bandwidth at all times. This can be better understood by considering FIG. 8, which shows a histogram resulting from the use of the congestion control process shown in FIG. 7. Each of the active channels is represented by a respective bar in the histogram. The bars are arranged in decreasing order of the values of $\rho_i$ of the channels that they represent, where $$\rho_i = \frac{\lambda_i}{\mu_i}.$$

Figure 8:
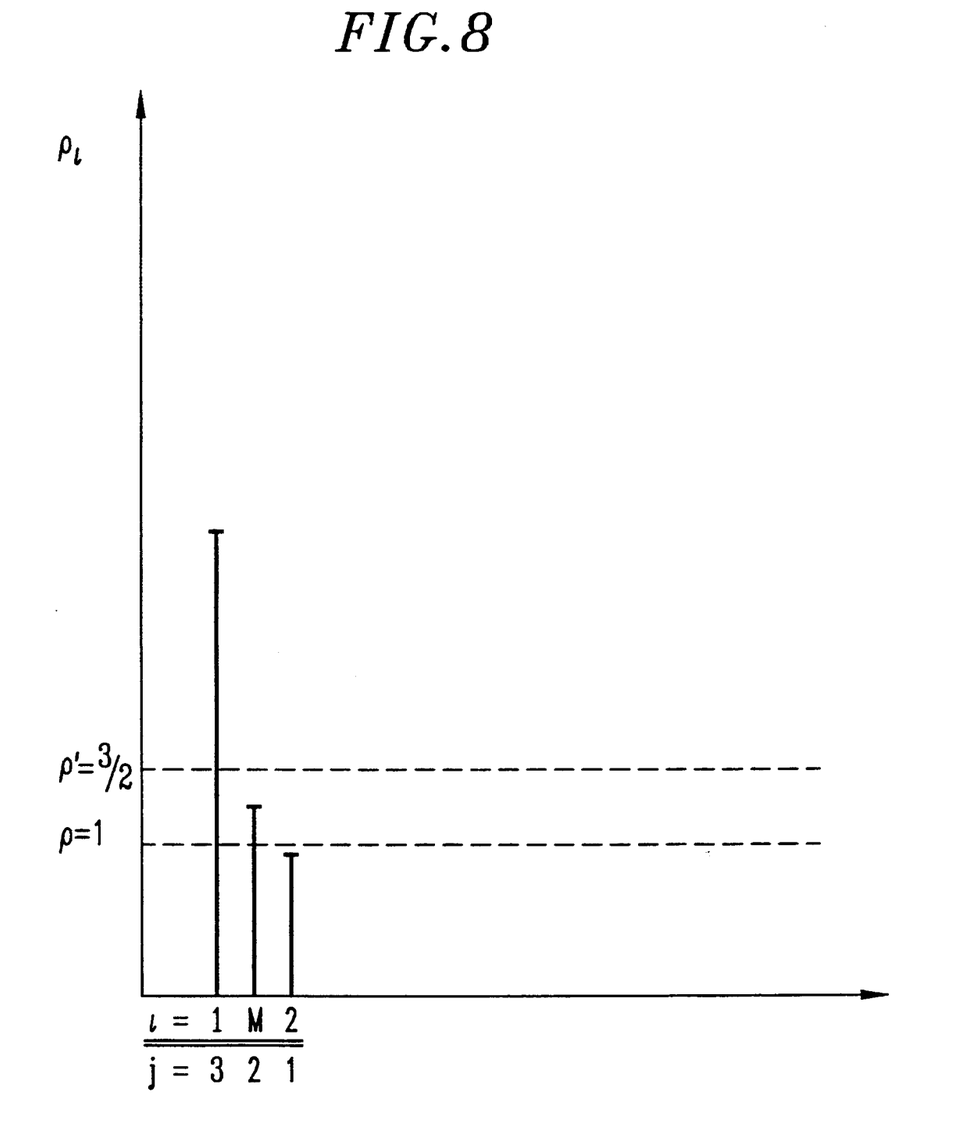
FIG. 8 shows a histogram which helps illustrate some of the characteristics of the congestion control process shown in FIG. 7.

For reference purposes, the line indicating $\rho_i=1$ for all active channels i is shown. This line indicates the point at which each channel is making full use of its contracted-for bandwidth. According to prior art congestion control techniques, under conditions of congestion, any active channel that exceeded its contracted-for bandwidth, and for which, therefore, the line $\rho_i=1$ is exceeded, would have some data elements dropped.

$\rho'$ is a threshold in the $\rho_i$ domain for a particular number of active channels. When, for a particular resource at a particular point in time, a channel's $\rho_i$ exceeds $\rho'$, this indicates that the channel i is major causation of congestion at the resource. As such, the resource does not have the capability to service all the data elements that are arriving from that channel. Therefore, in accordance with an aspect of the invention, channels that have a $\rho_i$ beyond $\rho'$ will, sooner or later, have data elements dropped in step 711 (FIG. 7). However, advantageously, unlike in the prior art and in accordance with aspects of the invention, data elements for those channels that do not exceed the level of $\rho'$ at any time will not be dropped, even if there is congestion at the resource, despite the fact that such channels are regularly exceeding their contracted-for bandwidths and thus for which $\rho_i > 1$. $\rho'$ thus represents a gain in usable bandwidth to the active channels above and beyond their contracted-for bandwidths that can be attained without causing the dropping of data elements. This gain is derived from the bandwidths of those channels that are inactive or are below their contracted-for bandwidth.

The value of $\rho'$ is dynamic and it varies according to the number of active channels and their respective $\lambda_i$. Thus, while a channel exhibiting a particular type of data element supplying pattern may not be a major cause of congestion at a particular time, at a later time, the same supplying pattern may cause the channel to become a major cause of congestion. Such a change would result because of changes in the data element supplying pattern of other channels in the system. At any point in time, $\rho'$ can be calculated as follows:

1) First it is necessary to find a value J such that $$\sum_{j=1}^{J} \lambda_j + \sum_{j=J+1}^{N} \lambda_J \leq \mu \text{ and}$$

$$\sum_{j=1}^{J+1} \lambda_j + \sum_{j=J+2}^{N} \lambda_{J+1} > \mu$$

where j is an index ranging from 1 to N that specifies the active channels in accordance with increasing values of $\rho_i$, as shown in FIG. 6.

2) Next, a value of x is found such that $$x = \frac{\mu - \left(\sum_{j=1}^{J} \lambda_j + \sum_{j=J+1}^{N} \lambda_J\right)}{\sum_{j=J+1}^{N} \nu_j}.$$

3) Finally, $\rho'$ is determined from $\rho' = \rho_J + x$.

The foregoing can thus be seen to be the determination of a capability of the resource to service data elements arriving on a particular active channel. This capability is determined as a function of at least i) a contracted-for bandwidth for each active channel at the resource, ii) the arrival rate of data elements for the particular active channel and iii) the arrival rates of data elements for each active channel at the resource that is not the particular active channel. Data elements on the particular active channel are dropped if the determined capability of the resource is exceeded. This can be contrasted with the prior art, which examines the contracted-for bandwidth for each active channel and the total arrival rate of data elements at the resource.

Values for global congestion threshold 403 and local congestion thresholds 503 are best determined by developing initial estimates through the use of well known network design principles and projected traffic conditions. These estimates are then fine tuned by employing observations of the system during actual use. Those skilled in the an will be familiar with the design principles necessary to derive such initial estimates. They will also realize that, because of the myriad possible design goals for such networks, as well as their infinite possible configurations, it is not possible to list or prescribe predetermined calculations for setting global congestion threshold 403 and local congestion thresholds 503. As a result, estimation with observation based corrections that are developed via trial and error is the best available method. The initial estimates will be a function of the parameters of the contract. For example, in addition to bandwidth, the contracted-for parameters may include a guaranteed minimum for the allowable maximum length of the queue at each resource.

Figure 9:
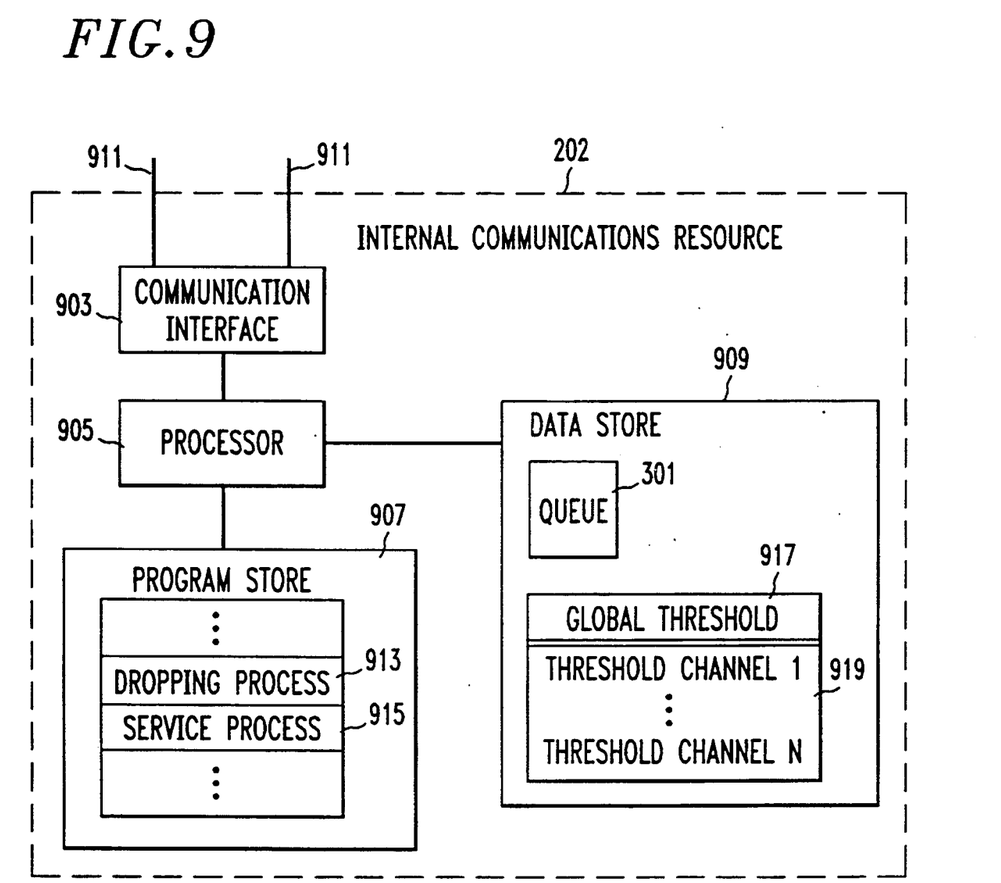
FIG. 9 shows an exemplary embodiment of an internal communications resource shown in FIG. 2.

FIG. 9 shows an exemplary embodiment of internal communications resource 201 (FIG. 2). Shown are a) communication interface 903, b) processor 905, c) program store 907, and d) data store 909. Communication interface 903 transmits data elements to and receives data elements from other nodes of data network 100 over links 911. Data elements received by communication interface 903 are supplied to processor 905. Similarly, processor 905 supplies the data elements for transmission to communication interface 903. Processor 905 controls the operation of internal communications resource 201 by executing the programs stored in program store 907, which includes dropping process 913 and service process 915. Thus, processor 905 and dropping process 913 form a means for dropping an arriving data element while processor 905 and dropping process 913 form a data element server for serving data elements stored in queue 301. In particular, dropping process 913 is the software to perform the process described hereinabove for dropping data elements when congestion develops at internal communications resource 201, such as shown in FIG. 7. Thus, the dropping means formed by processor 905 and dropping process 913 drops an arriving data element that causes both a) the congestion threshold of internal communications resource 201, and b) the congestion threshold of the channel on which a particular data element arrives, to be exceeded. Service process 915 is the software to perform the weighted round-robin service discipline and the servicing of the data elements. Data elements awaiting service at internal communications resource 201 are queued in queue 301 (FIG. 3) of data store 909. Data store 909 also stores the thresholds for use by dropping process 913, e.g., a) global threshold 917, which is the congestion threshold for internal communication resource 201 and b) channel thresholds 919, which are the congestion thresholds for each channel.

In other embodiments, the value of global congestion threshold 403 may change over time. For example, it may be adjusted based on to the average queue occupancy. Similarly, the value of local congestion thresholds 503-i may change over time. In still further embodiments, the values of global congestion threshold 403 and local congestion thresholds 503-i may be adjusted every time they are traversed so that they create a hysteresis effect in the determination of the existence of congestion.

The foregoing merely illustrates the principles of the inventions. It will thus be appreciated that those skilled in the an will be able to devise various arrangements which, although not explicitly described or shown herein, embody the principles of the invention and are thus within its spirit and scope.

We claim:

1. A method for use in controlling congestion at a resource of a data network at which resource a plurality of channels are active, said resource comprising at least a queue and a server, the method characterized by the steps of:

making a determination as to whether or not said resource can guarantee that it will service a data element arriving on a particular active channel of said plurality of channels prior to placing said arriving data element in said queue, said determination being made as a function of i) a contracted-for bandwidth for each of said active channels, ii) the arrival rate of data elements for the particular active channel and iii) the arrival rate of data elements for each active channel of said plurality that is not said particular active channel, said determining being independent of any indication, stored for said data element, that said data element exceeded the contracted-for bandwidth of the channel on which it arrived; and dropping said arriving data element so that it is not placed in said queue only when the result of said determination is that said resource cannot guarantee that it will service a particular arriving data element.

2. The method as defined in claim 1 wherein said determination is made at said resource.

3. The method as defined in claim 1 wherein said determination is also a function of at least the service rate of said resource.

4. A method for use in controlling congestion that develops at a resource of a data network in which channels have predetermined contracted-for bandwidths and each data element in said network is associated with one of said channels, said resource comprising a queue and a server, the method characterized by the steps of:

processing data elements into said resource of said data network, said processing being independent of the contracted-for bandwidths of said channels;

maintaining at said resource a congestion threshold for each channel; and dropping a data element arriving at said resource without ever placing said data element in said queue of said resource when said arriving data element causes a congestion threshold of the channel associated with said data element to be exceeded and when a global congestion threshold for said resource that is less than the maximum capacity of said queue is exceeded.

5. The method as defined in claim 4 further including the step of queuing said arriving data element at said resource if the congestion threshold for its associated channel is not exceeded.

6. The method as defined in claim 4 wherein said congestion threshold for each channel is a predetermined queue length for data elements associated with said channel.

7. Apparatus for use in controlling congestion that develops at resources of a data network in which channels have predetermined contracted-for bandwidths and each data element in said network is associated with one of said channels, each of a plurality of said resources comprising:

a queue for temporarily storing data elements a data element server for serving data elements stored in said queue;

means for maintaining at said each resource a congestion threshold for said resource, said threshold being less than the maximum capacity of said queue;

means for maintaining at said each resource a congestion threshold for each channel; and means for dropping an arriving data element that causes both a) the congestion threshold of said resource and b) the congestion threshold of the channel associated with said data element to be exceed, so that said arriving data element is not stored in said queue, said dropping being independent of any indication, stored for said data element, that said data element exceeded the contracted-for bandwidth of the channel on which it arrived.

8. A method for use in performing congestion control of data elements in a data network having internal resources, each of said internal resources comprising a queue and a server, and each data element being associated with a particular channel, the method characterized by the steps of:

making a determination that a global congestion threshold for an internal resource is exceeded, said global threshold being less than the maximum capacity of the queue of said internal resource; and in response to said determination, dropping a data element arriving at said internal resource without ever placing said data element in said queue of said internal resource when said arriving data element causes a threshold that is a predetermined function of at least a bandwidth associated with said channel to be exceeded, said dropping being independent of any indication, stored for said data element, to indicate the capability of said data network to drop said data element.

9. The method as defined in claim 8 wherein said internal resource employs a weighted round-robin service discipline.

10. The method as defined in claim 8 wherein said predetermined function is a predetermined constant function.

11. The method as defined in claim 10 wherein said internal resources employ a weighted round-robin service discipline.

12. A method for controlling congestion in a network in which resources of said network serves data elements from respective queues according to a head-of-the-line weighted round-robin service discipline so that each of said queues is logically divided into a plurality of sub-queues, one sub-queue for each active channel at each resource, said method characterized by the steps of:

receiving a new data element that requires service at a resource; and dropping said new data element without ever putting it into the queue of said resource only when both i) the length of said queue has exceeded a predetermined threshold the value of which is less than the maximum Capacity of the queue of said resource and ii) the sub-queue of the channel of said new data element has exceeded a predetermined threshold for said sub-queue of said channel, said dropping being independent of any indication, stored for said data element, that said data element exceeded a contracted-for bandwidth of the channel from which it was received.

13. A method for use in a data network in which data elements are communicated over respective associated channels among an interconnected plurality of network access point resources and network internal resources, said network access point resources receiving data elements from data element sources and said network internal resources receiving data elements only from said access point resources or others of said internal resources, said channels having associated bandwidth allocations, said method comprising the steps of:

processing said data elements into said data network independent of said bandwidth allocations; and in response to the existence of a congestion condition at a particular internal resource, dropping data elements received from a particular channel or channels which, on a proportional basis with respect to their respective associated bandwidth allocations, have most exceed their bandwidth allocations over a predetermined time interval.

14. A method for use in a data network in which data elements are communicated over respective associated channels among an interconnected plurality of network access point resources and network internal resources, said network access point resources receiving data elements from data element sources and said network internal resources receiving data elements only from said access point resources or others of said internal resources, and said channels having associated bandwidth allocations, said method comprising the steps of:

processing said data elements into said data network independent of said bandwidth allocations;

storing received data elements at each particular resource;

processing data elements out of each said resource at rates which are determined by the bandwidth allocations of their respective associated channels; and selectively dropping data elements received by a particular internal resource from a particular channel as a function of a) the total number of data elements stored in that resource at the time of receipt and b) the number of data elements from that channel that are stored in that resource at said time.

15. The method of claim 14 wherein in said selectively dropping step, a data element received from said particular channel is dropped only if both said total number and said number exceed respective thresholds.

16. The apparatus as defined in claim 7 wherein said data element server serves said data elements using a weighted round-robin service discipline.

17. A method for use in controlling congestion at a resource of a data network at which resource a plurality of channels are active, said resource comprising at least a queue and a server, the method characterized by the steps of:

making a determination as to whether or not said resource can guarantee that it will service a data element arriving on a particular active channel of said plurality of channels prior to placing said arriving data element in said queue, said determination being made as a function of i) a contracted-for bandwidth for each of said active channels, ii) the arrival rate of data elements for the particular active channel and iii) the arrival rate of data elements for each active channel of said plurality that is not said particular active channel, said determining being independent of any indication, stored for said data element, that said data element has not exceeded the contracted-for bandwidth of the channel on which it arrived; and placing said arriving data element in said queue only when the result of said determination is that said resource can guarantee that it will service a particular arriving data element.

* * * * *